United States Patent
Maeda et al.

(10) Patent No.: US 9,940,529 B2
(45) Date of Patent: Apr. 10, 2018

(54) PARKING SPACE RECOGNITION APPARATUS AND PARKING SPACE RECOGNITION SYSTEM

(71) Applicant: DENSO CORPORATION, Kariya, Aichi-pref. (JP)

(72) Inventors: Yuu Maeda, Ichinomiya (JP); Naoki Kawasaki, Kariya (JP); Osamu Shimomura, Okazaki (JP); Junichiro Funabashi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 131 days.

(21) Appl. No.: 14/838,881

(22) Filed: Aug. 28, 2015

(65) Prior Publication Data

US 2016/0071415 A1 Mar. 10, 2016

(30) Foreign Application Priority Data

Sep. 4, 2014 (JP) ................................. 2014-180408

(51) Int. Cl.
*B60R 1/00* (2006.01)
*G06K 9/00* (2006.01)

(52) U.S. Cl.
CPC ............ *G06K 9/00812* (2013.01); *B60R 1/00* (2013.01); *B60R 2300/30* (2013.01); *B60R 2300/302* (2013.01); *B60R 2300/50* (2013.01); *B60R 2300/70* (2013.01); *B60R 2300/806* (2013.01)

(58) Field of Classification Search
CPC ................ B60R 1/00; B60R 2300/105; B60R 2300/806; B60R 2300/80; G06K 9/00812; G06K 9/00798
See application file for complete search history.

(56) References Cited

U.S. PATENT DOCUMENTS

| | | | |
|---|---|---|---|
| 2008/0291054 A1 | 11/2008 | Groft | |
| 2010/0328104 A1 | 12/2010 | Groft | |
| 2012/0169526 A1* | 7/2012 | Reilhac | B60W 50/0098 342/70 |
| 2014/0152774 A1* | 6/2014 | Wakabayashi | G08G 1/168 348/46 |
| 2014/0354452 A1* | 12/2014 | Okuyama | B62D 15/028 340/932.2 |

FOREIGN PATENT DOCUMENTS

| | | |
|---|---|---|
| JP | H11-153406 | 6/1999 |
| JP | 2002-288795 | 10/2002 |
| JP | 3341664 B2 | 11/2002 |

(Continued)

*Primary Examiner* — Obafemi Sosanya
(74) *Attorney, Agent, or Firm* — Knobbe, Martens, Olson & Bear, LLP

(57) ABSTRACT

A parking space recognition apparatus includes an onboard camera, a wireless receiver, and a parking space determination portion. The onboard camera is mounted to a first vehicle and captures a peripheral image around the first vehicle. The wireless receiver is mounted to the first vehicle and receives a parking-space related information that is transmitted from an outside of the first vehicle. The parking space determination portion is mounted to the first vehicle and determines a parking space to park the first vehicle on a basis of the peripheral image and the parking-space related information.

10 Claims, 6 Drawing Sheets

(56) References Cited

FOREIGN PATENT DOCUMENTS

| | | |
|---|---|---|
| JP | 2005-193742 A | 1/2004 |
| JP | 2007-326514 A | 6/2006 |
| JP | 2010-117151 | 5/2010 |
| JP | 2010-140135 | 6/2010 |
| JP | 2011-065279 | 3/2011 |

* cited by examiner

PARKING SPACE RECOGNITION APPARATUS AND PARKING SPACE RECOGNITION SYSTEM

CROSS REFERENCE TO RELATED APPLICATION

This application is based on Japanese Patent Application No. 2014-180408 filed on Sep. 4, 2014, the disclosure of which is incorporated herein by reference.

TECHNICAL FIELD

The present disclosure relates to a parking space recognition apparatus that determines a parking space on the basis of an image captured by an onboard camera and a parking space recognition system including the parking space recognition apparatus.

BACKGROUND ART

Patent literature 1: Japanese Patent No. 3341664 B2

For example, patent literature 1 discloses image analysis captured by an onboard camera to detect a parking compartment line. Patent literature 1 detects a parking compartment line based on a change of a brightness value in an image captured by the onboard camera. When one pair of parking compartment lines is detected, a space between the parking compartment lines is recognized as a parking compartment, which is a parking space.

The inventors of the present application have found the following.

An image captured by an onboard camera may include a portion where a brightness value changes, in addition to a boundary of parking compartment lines. A portion other than the parking compartment lines may be erroneously recognized as a parking compartment line. When no parking compartment line is present, a parking space may not be determined.

SUMMARY

It is an object of the present disclosure to provide a parking space recognition apparatus and a parking space recognition system that recognizes a parking space accurately.

According to one example of the present disclosure, a parking space recognition apparatus is provided. The parking space recognition apparatus includes an onboard camera mounted to a first vehicle and capturing a peripheral image around the first vehicle; a wireless receiver also mounted to the first vehicle and receiving a parking-space related information that is transmitted from an outside of the first vehicle; and a parking space determination portion also mounted to the first vehicle and determining a parking space to park the first vehicle on a basis of the peripheral image captured by the onboard camera and the parking-space related information received by the wireless receiver.

According to another example of the present disclosure, a parking space recognition system is provided. The parking space recognition system includes the parking space recognition apparatus; a parking detector detecting a parking of a second vehicle; a position detector detecting a position of the second vehicle; and a wireless transmitter transmitting, as the in-parking information, the position of the second vehicle detected by the position detector when the position detector detects the parking of the second vehicle.

According to another example of the present disclosure, a parking space recognition system is provided. The parking space recognition system includes the parking space recognition apparatus; a vehicle-parked compartment detector mounted to a second vehicle and sequentially detecting the vehicle-parked compartment during a travel of the second vehicle in a parking lot; and a wireless transmitter also mounted to the second vehicle and transmitting a position of the vehicle-parked compartment detected by the vehicle-parked compartment detector as the in-parking information.

According to another example of the present disclosure, a parking space recognition system is provided. The parking space recognition system includes the parking space recognition apparatus; a parking range detector mounted to the second vehicle and sequentially detecting a range where the parked vehicle is positioned during a travel of the second vehicle in a parking lot; and a wireless transmitter also mounted to the second vehicle and transmitting a range where the parked vehicle is positioned, the range being detected by the parking range detector, as the parking range information.

According to the present disclosure, a parking space is determined using the wirelessly received parking-space related information in addition to a peripheral image captured by the onboard cameras. It may be possible to improve recognition accuracy of the parking space in comparison with the recognition accuracy of the parking space by use of only the peripheral image captured by the onboard camera.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
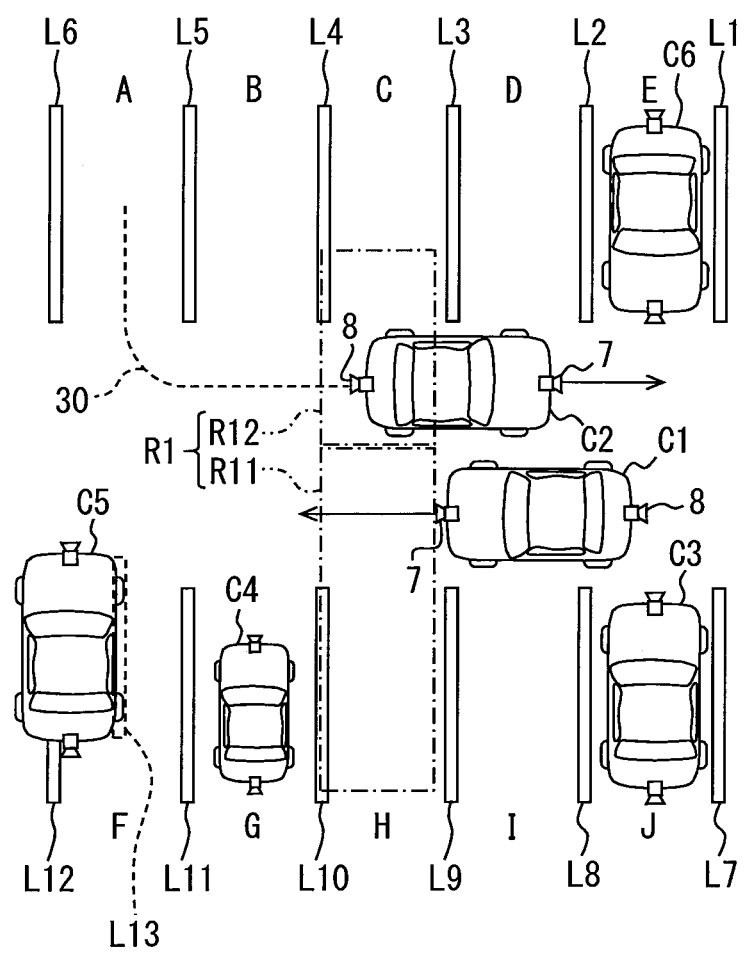
FIG. 1 is a diagram illustrating a parking lot map recognized by a parking space recognition apparatus.

Embodiments of the present disclosure will be described with referring to the drawings. In FIG. 1, each a first vehicle C1 and a second vehicle C2 include a front camera 7 and a rear camera 8. The front camera 7 and the rear camera 8 are parts of a parking space recognition apparatus 1 described in FIG. 2. That is, the parking space recognition apparatus 1 is mounted to the first vehicle C1 and second vehicle C2, respectively. A parking space recognition system includes the parking space recognition apparatus 1 mounted to the first vehicle C1 and the parking space recognition apparatus 1 mounted to the second vehicle C2.

In FIG. 1, the first vehicle C1 and the second vehicle C2 travel on a path in a parking lot in different directions (passing-by directions). A third vehicle C3, a fourth vehicle C4, a fifth vehicle C5, and a sixth vehicles C6 are in parked. The third vehicle C3, the fourth vehicle C4, the fifth vehicle C5, and the sixth vehicles C6 have been already parked.

Figure 2:
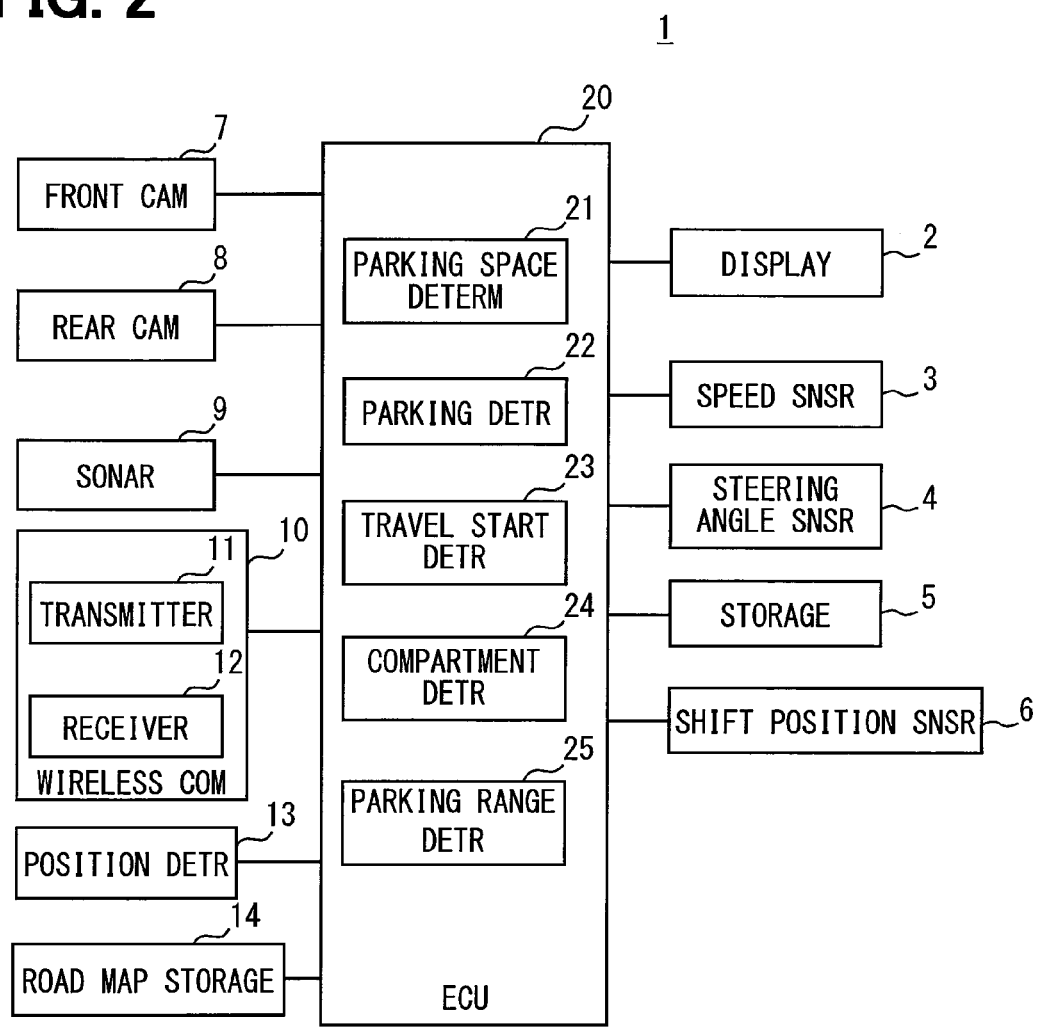
FIG. 2 is a diagram illustrating the parking space recognition apparatus.

As described in FIG. 2, the parking space recognition apparatus 1 includes a display 2, a vehicle speed sensor 3, a steering angle sensor 4, a storage portion 5, a shift position sensor 6, the front camera 7, the rear camera 8, a sonar 9, a wireless communicator 10, a position detector 13, a road map storage portion 14, and an ECU 20. Hereinafter, by use of the parking space recognition apparatus 1 mounted to the first vehicle C1 as an example, a configuration of the parking space recognition apparatus 1 will be explained.

The display 2 is disposed in a cabin of the first vehicle C1, and displays a peripheral image captured by the front camera 7 or the rear camera 8. The vehicle speed sensor 3 detects a vehicle speed of the first vehicle C1. The steering angle sensor 4 detects a steering angle of the first vehicle C1. The storage portion 5 is a writable storage portion, and stores a parking-space related information that is transmitted from a different vehicle (for example, the second vehicle C2) and received by the wireless receiver 12. The shift position sensor 6 detects a shift position of the first vehicle C1.

The front camera 7 may correspond to an example of an onboard camera. The front camera 7 is mounted to the front end of the first vehicle C1, and captures an image of the forward direction and a periphery of the first vehicle C1. The image captured by the front camera 7 is referred to as a forward peripheral image. The front camera 7 includes a fish-eye lens having an angle of view of about 180 degrees. The angle of view is large, and the periphery in the forward peripheral image is distorted.

The rear camera 8 has the identical configuration as the front camera 7 except for an attachment position. The rear camera 8 may also correspond to an example of an onboard camera. The rear camera 8 is attached to the rear end of the first vehicle C1 and images the rearward direction of the first vehicle C1 and the periphery of the first vehicle C1. Images captured by the rear camera 8 will be referred to as a rearward peripheral image.

The front end of the first vehicle C1 includes multiple sonars 9, and the rear end of the first vehicle C1 also includes multiple sonars 9. Multiple sonars 9 are provided to the front end and the rear end of the first vehicle C1 respectively to detect objects around the first vehicle C1. The sides of the first vehicle C1 may include one or more sonars 9.

The wireless communicator 10 performs inter-vehicle communications (also, referred to as a vehicle-vehicle communication) and a road-to-vehicle communication. The wireless communicator 10 includes a wireless transmitter 11 that transmits electric waves to the outside of the first vehicle C1, and a wireless receiver 12 that receives electric waves transmitted from the outside of the first vehicle C1. Frequency of the electric waves used by the wireless communicator 10 is, for example, in 5.8 GHz band, 5.9 GHz band, and 700 MHz band. The wireless communicator 10 is controlled by the ECU 20 and performs transmission and reception of the parking-space related information. Specific contents of the parking-space related information will be described later.

The position detector 13 includes a global navigation satellite system (GNSS) receiver used in a global navigation satellite system to detect a position of a subject apparatus on the basis of electric waves from satellites. Based on the signal received by the GNSS receiver, a present position is detected sequentially. A road map data is stored in the road map storage portion 14.

The ECU 20 is a computer including a CPU, ROM, and RAM, and connected to the components 2 to 14 of the parking space recognition apparatus 1 directly or through an in-vehicle LAN. The ECU 20 functions as a parking space determination portion 21, a parking detector 22, a travel start detector 23, a vehicle-parked compartment detector 24, and a parking range detector 25 by making the CPU execute programs stored in the ROM while using a temporary storage function of the RAM. Some or all functions performed by the control portion may be hardwired by one or more ICs.

On the basis of the parking-space related information received by the wireless receiver 12 and the peripheral image captured by the front camera 7 and the rear camera 8, the parking space determination portion 21 searches for a parking space where the first vehicle C1 can be parked. Incidentally, the parking space where the first vehicle C1 can be parked is a space where a vehicle can be parked and a different vehicle is absent. Processing of the parking space determination portion 21 will be described later in reference to flowcharts of FIG. 3 or later.

The parking detector 22 detects that the first vehicle C1 has been parked. Parking of the first vehicle C1 is detected when a shift position acquired from the shift position sensor 6 enters a park position.

When detecting that the first vehicle C1 has been parked, the parking detector 22 transmits the in-parking information from the wireless transmitter 11 to the outside of the vehicle. The in-parking information includes information showing that the first vehicle C1 is in parked (a parking status) and includes a present position of the first vehicle C1. A transmission method of the in-parking information from the wireless transmitter 11 may be any of broadcasting, unicast, and multicast as long as the wireless receiver 12 included in a peripheral vehicle receives the in-parking information.

As described above, the parking space recognition apparatus 1 is mounted also to the second vehicle C2. The parking detector 22 of the parking space recognition apparatus 1 mounted to the second vehicle C2 detects that the second vehicle C2 has been parked. When detecting that the second vehicle C2 has been parked, the parking detector 22 transmits the in-parking information to the outside of the vehicle.

The travel start detector 23 detects that the first vehicle C1 has ended the parking status and started traveling. The end of the parking status is detected when the shift position enters a forward position (for example, a drive position) or a backward position (for example, a reverse position) from the park position. The start of traveling is detected when a vehicle speed detected by the vehicle speed sensor 3 is a value other than zero. The travel start detector 23 transmits travel start information to the outside of the vehicle when detecting that the first vehicle C1 has started traveling. The travel start information includes information showing that the end of parking and includes a parked position before the end of parking. The end of parking may show that the parked position becomes an unoccupied state (a non-parked state).

The travel start detector 23 of the parking space recognition apparatus 1 mounted to the second vehicle C2 detects that the second vehicle C2 has ended parking and started traveling. When detecting that the second vehicle C2 has started traveling, the travel start detector 23 transmits the travel start information to the outside of the vehicle.

The vehicle-parked compartment detector 24 sequentially detects a vehicle-parked compartment while the first vehicle C1 travels in a parking lot. The traveling in the parking lot is detected by using a present position detected by the position detector 13 and a road map data stored in the road map storage portion 14. The vehicle-parked compartment is a parking compartment where a vehicle has been parked. The parking space determination portion 21 determines a position of a parking compartment according to processing described later.

It is determined whether a vehicle has been parked in a parking compartment by an object detection processing using the sonar 9. When an object is present in the parking compartment and has a size corresponding to a vehicle, it is determined that a vehicle has been parked in the parking compartment. When the peripheral images captured by the front camera 7 and the rear camera 8 are analyzed and a vehicle is imaged in a parking compartment, it may be determined that a vehicle has been parked in the parking compartment. The information about the vehicle-parked compartment detected by the vehicle-parked compartment detector 24 is transmitted as a part of the parking-space related information.

The parking range detector 25 sequentially detects a range where a parked vehicle is positioned while the first vehicle C1 travels in the parking lot. A range of a parked vehicle is a range on a road where each vehicle exists. In order to determine the range of the parked vehicle, a relative range of a parked vehicle to the first vehicle C1 is determined. The relative range of the parked vehicle is determined by an object detection using the sonar 9 or by analysis of the peripheral images captured by the front camera 7 and the rear camera 8. According to the relative range and a position of the first vehicle C1 at the time of detection of the relative range of the parked vehicle, the range of the parked vehicle is determined. In the processing to detect the range of the parked vehicle, the parking range detector 25 also detects ranges of an obstacle such as a curbstone, a pole, or the like.

To detect a parked vehicle and an obstacle by analyzing the peripheral images captured by the front camera 7 and the rear camera 8, an edge point of a brightness value is detected. When the parking-space related information is received from the outside of the vehicle and the parking-space related information includes parking availability information that indicates a parking compartment is available, an edge point detected in the parking compartment is interpreted as the edge point is not an object.

The parking range detector 25 of the parking space recognition apparatus 1 mounted to the second vehicle C2 sequentially detects a range where a parked vehicle and an obstacle are positioned during travel of the second vehicle C2 in the parking lot and generates parking range information and obstacle information. The parking range information indicating a range of a parked vehicle and the obstacle information indicating a range of an obstacle are transmitted to the outside as part of the parking-space related information.

Figure 3:
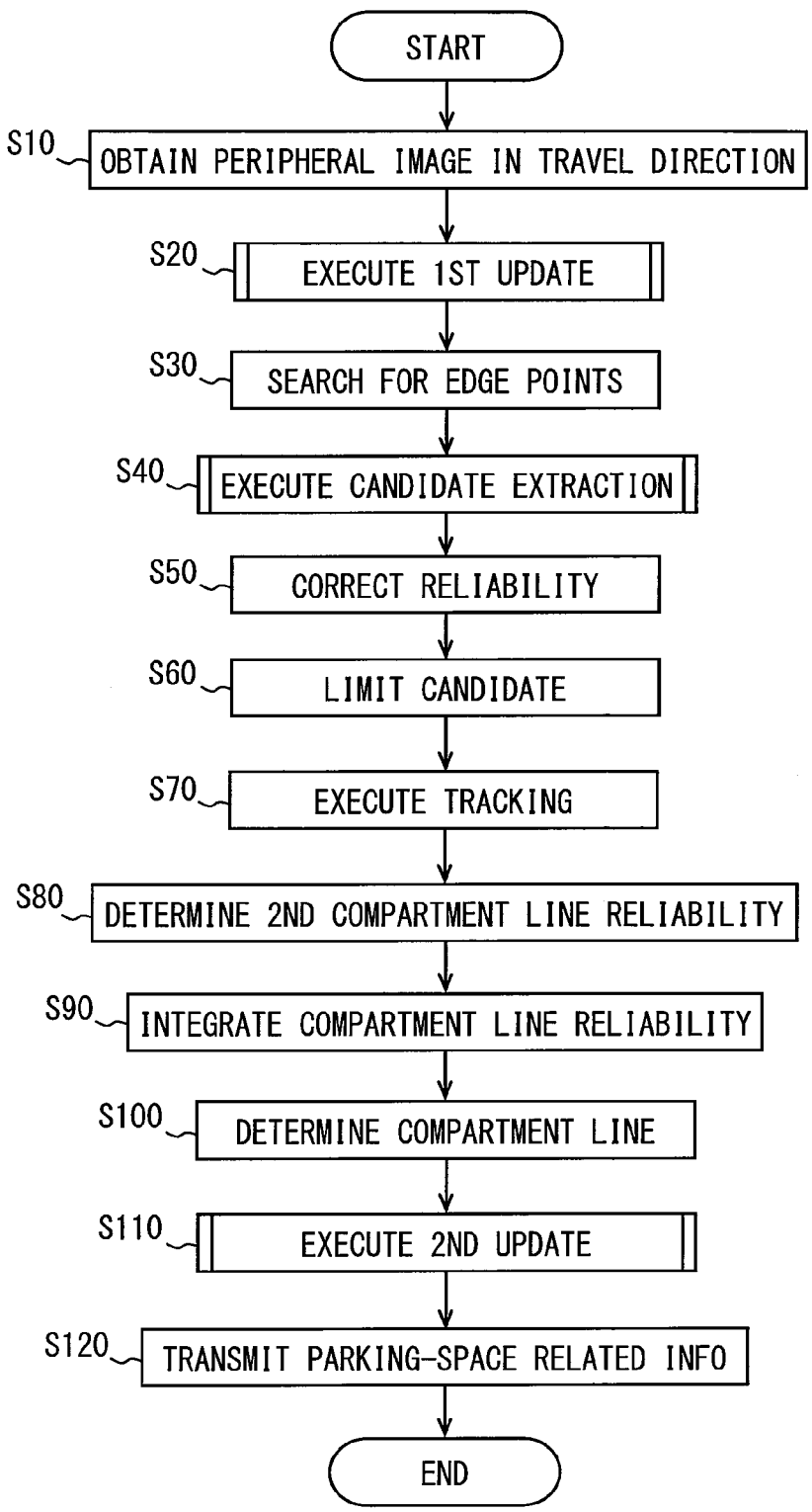
FIG. 3 is a flowchart illustrating processing executed by a parking space determination portion.

The processing of the parking space determination portion 21 will be explained with referring to FIG. 3 or later. The processing shown in FIG. 3 is repeated when the first vehicle C1 is in the parking lot.

At S10, the peripheral image in the traveling direction is acquired from the front camera 7 or the rear camera 8. In FIG. 1, since the first vehicle C1 is traveling, the forward peripheral image is acquired from the front camera 7.

At S20, the parking-space related information stored in the parking space recognition apparatus 1 of the first vehicle C1 is updated as a first update processing on the basis of the parking-space related information received from the outside of the vehicle. The first update processing is described in FIG. 4.

Figure 4:
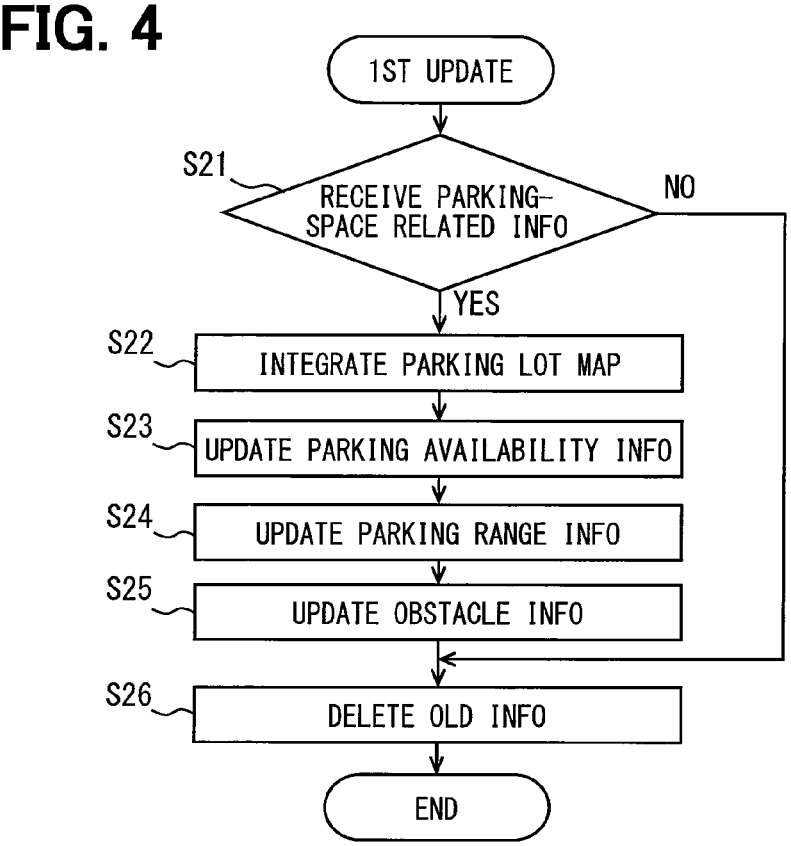
FIG. 4 is a flowchart illustrating S20 of FIG. 3.

In FIG. 4, it is determined at S21 whether the parking-space related information has been received from the outside. When the parking space recognition apparatus 1 mounted to the second vehicle C2 performs S120 to transmit the parking-space related information and when the wireless receiver 12 of the wireless communicator 10 mounted to the first vehicle C1 receives the parking-space related information, S21 is determined as YES.

When S21 is determined as NO, the processing shifts to S26. When the determination is YES, the processing shifts to S22. When the received parking-space related information includes at least any of parking lot map, the parking availability information, the parking range information, the obstacle information, and vehicle travel information.

Figure 6:
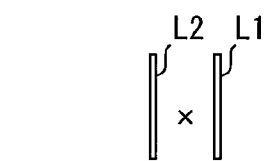
FIG. 6 is a diagram illustrating an example of a parking lot map held by a first vehicle.

The parking lot map includes positions of multiple parking compartment lines that define one or more parking compartments. FIG. 6 shows a parking lot map generated from parking compartment lines recognized using the front camera 7 when the parking space recognition apparatus 1 mounted to the first vehicle C1 performs processings of S30 to S100 in a case of FIG. 1.

The parking lot map of FIG. 6 includes information to define positions of six parking compartment lines L1, L2, L7, L8, L9, L10. The information includes endpoints of each of the parking compartment lines L1, L2, L7, L8, L9, L10. Since only a position of each parking compartment line L should be defined, the parking lot map may be information including one endpoint of each parking compartment line L, a length of each parking compartment line L, and a direction of each parking compartment line L, instead of the above endpoints of each parking compartment line L.

Figure 7:
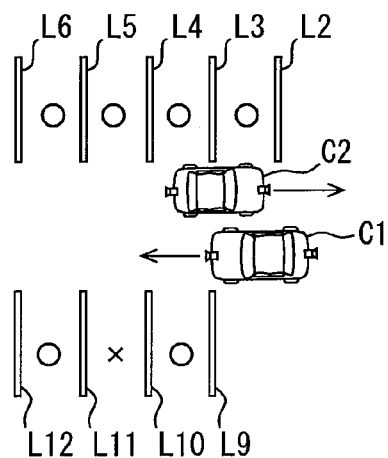
FIG. 7 is a diagram illustrating an example of a parking lot map held by a second vehicle.

FIG. 7 shows a parking lot map generated by the parking space recognition apparatus 1 mounted to the second vehicle C2 by analyzing the peripheral image captured by the front camera 7 in the situation of FIG. 1. The parking lot map generated by analyzing the peripheral image includes a range of about five meters ahead in the vehicle traveling direction. The image captured using a fish-eye lens provides wide angle views. However, the image is distorted at a distance with less accuracy analysis.

FIG. 1 also shows a search area R1 to search for the parking compartment line by the front camera 7 mounted to the first vehicle C1. The second vehicle C2 is positioned in the search area R1 in FIG. 1. In the search area R1, a parking compartment line is not recognizable in an obstruction area R12 obstructed by the second vehicle C2 even when the forward peripheral image is analyzed. Therefore, by analyzing forward images, the parking compartment line is recognizable only in a recognizable area R11 in the search area R1 except the obstruction area R12. The parking compartment lines L3 and L4 are not recognized.

Therefore, the parking lot map generated by sequential analysis of the forward peripheral image while the parking space recognition apparatus 1 mounted to the first vehicle C1 enters the parking lot from a right portion in FIG. 1 and then reaches the position in FIG. 1 defines the six parking compartment lines L1, L2, L7, L8, L9, L10.

The second vehicle C2 travels on a route 30 from a parking compartment A where the second vehicle C2 is in parked to a position described in FIG. 1. Incidentally, symbols of parking compartment in FIG. 1 are conveniently given for explanation.

FIG. 7 shows a parking lot map that is generated by analysis of forward peripheral images by the parking space recognition apparatus 1 mounted to the second vehicle C2 until the second vehicle C2 reaches the position in FIG. 1 after the second vehicle C2 travels on the route 30 from the parking compartment A. The parking lot map of FIG. 7 defines positions of nine parking compartment lines L2 to L6, L9 to L12.

The parking availability information indicates whether each parking compartment included in the parking lot map is available or not. When a parked vehicle is present in a parking compartment, the parking compartment is unavailable. When a parked vehicle is absent in a parking compartment, the parking compartment is available. A parking compartment detected by the vehicle-parked compartment detector 24 is unavailable. When the vehicle-parked compartment detector 24 tries to detect a parked vehicle in a parking compartment but does not detect a parked vehicle, the parking compartment is available. In FIG. 6 and FIG. 7, a mark of a circle indicates that the parking compartment is available and a mark of a cross indicates that the parking compartment is unavailable. Incidentally, the parking availability information indicating that the parking compartment is unavailable corresponds to an example of in-parking information.

The parking range information indicates a range detected by the parking range detector 25. The obstacle information indicates a range of an obstacle detected when the parking range detector 25 detects the parking range.

The vehicle travel information is transmitted when a vehicle transmitting the vehicle travel information is traveling, and includes a position, speed, and steering angle of the vehicle.

Figure 8:
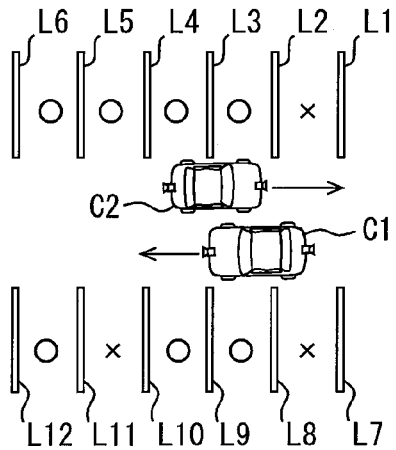
FIG. 8 is a diagram illustrating an example of a parking lot map corresponding to an integration of FIG. 6 and FIG. 7.

The parking lot maps are integrated at S22. When the parking lot map stored in the parking space recognition apparatus 1 mounted to the first vehicle C1 is FIG. 6 and the parking lot map received from the second vehicle C2 is FIG. 7, the parking lot map after the integration is FIG. 8. When the parking-space related information received from the second vehicle C2 does not include a parking lot map, the processing shifts to S23 without S22.

S23 updates the parking availability information. When the parking availability information stored in the parking space recognition apparatus 1 mounted to the first vehicle C1 indicates the circle and the cross in FIG. 6, and when the parking availability information received from the second vehicle C2 indicates the circle and the cross in FIG. 7, the parking availability information after the integration is FIG. 8. When the received parking-space related information includes vehicle travel information and when, on the basis of the vehicle travel information, a future travel route of the vehicle that has transmitted the vehicle travel information is proceeding to a parking compartment, the parking availability information about the parking compartment indicates that the parking compartment is unavailable. When the parking-space related information received from the second vehicle C2 does not include parking availability information, the processing shifts to S24 without S23.

The parking range information is updated at S24. Specifically, the parking range information received from the second vehicle C2 is added to the parking range information held in the parking space recognition apparatus 1 mounted to the first vehicle C1. When the parking range information is not included in the parking-space related information received from the second vehicle C2, the processing shifts to S25 without S24.

The obstacle information is updated at S25. Specifically, the obstacle information received from the second vehicle C2 is added to the obstacle information held in the parking space recognition apparatus 1 mounted to the first vehicle C1. When the obstacle information is not included in the parking-space related information received from the second vehicle C2, the processing shifts to S26 without S25.

At S26, when a predetermined time elapses after information that has been updated with respect to the parking availability information, the parking range information, and the obstacle information, the information is deleted. The parking availability information and the parking range information change over time. The obstacle information also changes over time when the obstacle is movable.

The information having a difference between a time when the information is received from the outside and a time when S26 is executed is equal to or greater than a predetermined time is deleted from the parking availability information, the parking range information and the obstacle information that are received from the outside. At S30 or after, the parking compartment line that defines a parking compartment, that is, a parking space, is determined. The processing of S30 or after uses the parking availability information, the parking range information, and the obstacle information. The deleted information is not used to determine the parking compartment line.

When S20 is performed as described in FIG. 3, the processing shifts to S30. At S30, an area where the edge point is searched for is limited on the basis of the parking availability information updated at S20 and the present position of the first vehicle C1.

Specifically, when the search area R1 defined based on the present position of the first vehicle C1 includes an unavailable parking compartment, the unavailable parking compartment in the search area R1 is deleted from the area to be searched for the edge points. When the search area R1 defined based on the present position of the first vehicle C1 includes parking compartments H, C as described in FIG. 1, it is supposed that the parking compartment C is unavailable unlike in FIG. 1. In this case, it is supposed that the edge point is searched for in an area where the search area R1 excludes the parking compartment C. The search area R1 may be divided into a right side and a left side of the first vehicle C1, and only the parking-available side may be an area to be searched for the edge point.

Figure 9:
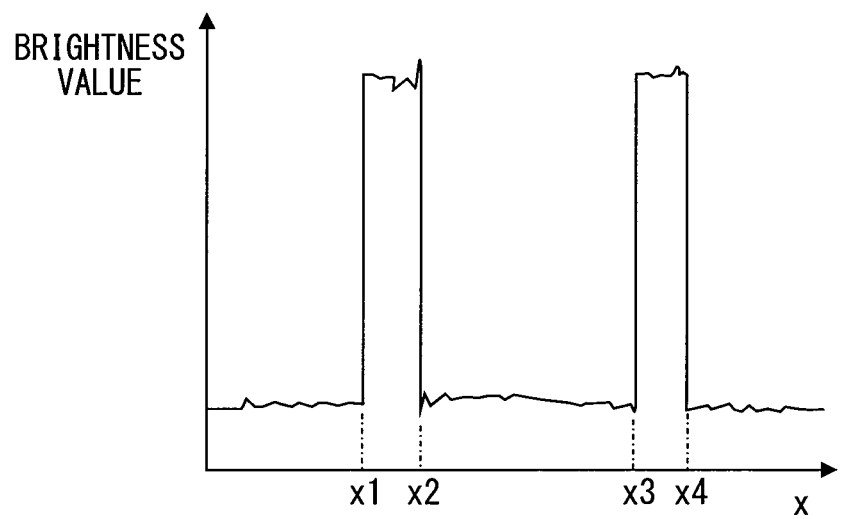
FIG. 9 is a diagram illustrating an up edge and a down edge determined at S30 of FIG. 3.

The edge point search processing is known. A brightness value of each point in the peripheral image is determined. A point whose brightness value changes largely relative to a brightness value of an adjacent point is defined as an edge point. The edge point is classified into an up edge point and a down edge point. In a peripheral image, the up edge point is at points x1, x3 at which brightness values rise greatly when the x-coordinate is changed and brightness values are plotted while the y-coordinate is fixed as shown in FIG. 9. On the contrary, the down edge point is at points x2, x4 at which brightness values fall greatly.

Figure 5:
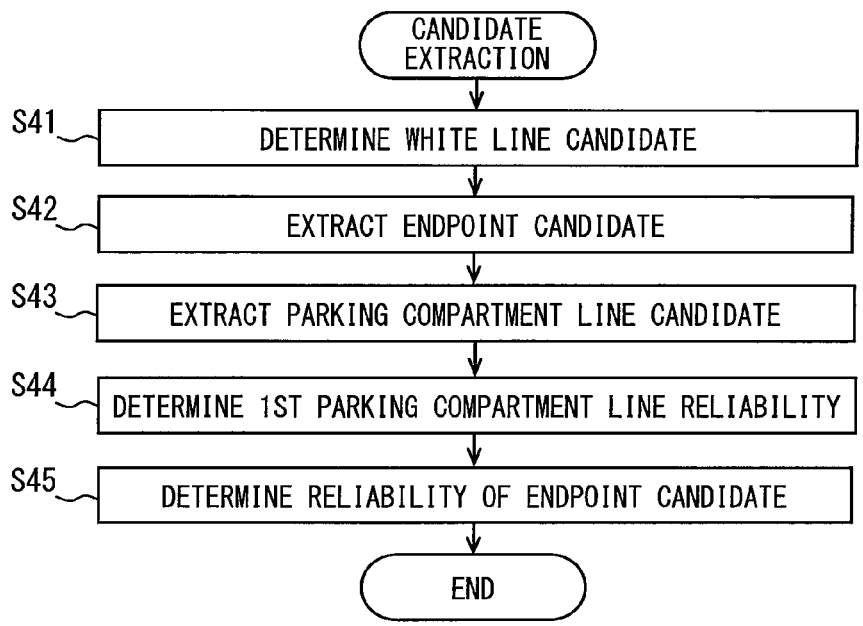
FIG. 5 is a flowchart illustrating S40 of FIG. 3.

S40 extracts a candidate of the parking compartment line and a candidate of an endpoint. FIG. 5 illustrates the processing. In FIG. 5, a white line candidate is determined at S41. The white line candidate is determined as follows. When the up edge point and the down edge point determined at S30 are plotted on the x-y coordinate plane, a portion where the up edge points are densely arranged substantially in line and a portion where the down edge points are densely arranged substantially in line are determined. When the arrangement of the up edge points and the arrangement of the down edge points are substantially in parallel to one another, a portion between the arrangements corresponds to a candidate of a white line (also, referred to as a while like candidate).

Endpoint candidates are extracted at S42. Specifically, an end of a portion where the up edge points are densely arranged substantially in line and an end of a portion where the down edge points are densely arranged substantially in line are extracted as endpoint candidates. Each endpoint candidate is one longitudinal end of the white line candidate. In this embodiment, the other longitudinal end of the white line candidate is a point distant from the endpoint candidate by a predetermined length (for example, five meters) in the longitudinal direction of the white line candidate.

A parking compartment line candidate is determined at S43. The parking compartment line candidate corresponds to a combination of two white line candidates determined at S41. All the combinations of the white line candidates determined at S41 may be parking compartment line candidates. Based on a predetermined criterion such as an exclusion of a combination of two white line candidates between which a distance is too long, a combination of white lines may be extracted as a parking compartment line candidate from the white line candidates determined at S41.

A first compartment line reliability is determined at S44. The first compartment line reliability is determined from at least one predetermined reliability determination item. The reliability determination items include, for example, a width between two white line candidates determined as a compartment line candidate, a parallelism of the two white line candidates, a continuity of adjacent parking compartment line candidates, a likelihood for a double line, and a degree of agreement of properties of two white line candidates.

The first compartment line reliability becomes higher as a width between two white line candidates is closer to a standard value of parking compartment lines. The first compartment line reliability becomes higher as two white line candidates are more parallel to one another. The continuity of adjacent parking compartment line candidates indicates a degree of agreement between widths and directions of the adjacent parking compartment line candidates. The first compartment line reliability becomes higher as the continuity is higher. The likelihood for a double line is a reliability determination item provided to consider that adjacent parking compartments are divided by a double line. The likelihood for a double line becomes higher as a width between two white line candidates is closer to a standard value of the double line that divides adjacent parking compartments. The properties of two white line candidates include color, brightness, length, and shape. The first compartment line reliability becomes higher as colors of the lines match one another.

At S45, a reliability of the endpoint candidate (hereinafter, also referred to as an endpoint reliability) is determined. The endpoint reliability is determined from a density of edge points (also referred to as an edge point density) around each endpoint candidate extracted at S42. For example, a local area about each endpoint candidate is set, and an edge point density in the local area is calculated. The endpoint reliability is higher as the edge point density is higher. The local area may be a predetermined area with the endpoint candidate at a center.

After the extraction and the reliability determination of the parking compartment line candidates and the extraction and the reliability determination of the endpoint candidates, the processing returns to FIG. 3 to perform S50. At S50, the first compartment line reliability and the endpoint reliability that are determined in the processing of FIG. 5 are corrected based on the parking range information.

When the parking-space related information received from the outside includes the parking range information, the parking range information is updated based on the parking range information received from the outside (S24). Therefore, S50 corrects the first compartment line reliability and the endpoint reliability on the basis of the parking range information received from the outside.

The first compartment line reliability is corrected as follows. The parking compartment line candidate including a white line candidate located farther from the first vehicle C1 than from a range of a parked vehicle is supposed as a target parking compartment line candidate. For example, in FIG. 1, it is supposed that the parking-space related information including a range of a fourth vehicle C4, which is a parked vehicle, has been received from the second vehicle C2. In this case, in the parking compartment line candidate including a parking compartment line L11 and a parking compartment line L10, the parking compartment line L11 is positioned farther from the first vehicle C1 than from the fourth vehicle C4, which is the parked vehicle. Therefore, the parking compartment line candidate including the parking compartment line L11 and parking compartment line L10 is the target parking compartment line candidate.

When the target parking compartment line candidate is determined, the first compartment line reliability determined at S44 is corrected on the basis of the range of the parked vehicle positioned at the determined target compartment line candidate. Specifically, a position of the parking-compartment-entrance facing end of the parked vehicle is compared to a position of the parking-compartment-entrance facing end of the target compartment line candidate. The parking-compartment-entrance facing end of the parked vehicle may be an end of the parked vehicle at a position of the parking-compartment entrance.

As the position of the parking-compartment-entrance facing end of the parked vehicle is closer to the position of the parking-compartment-entrance facing end of the target compartment line candidate, the first compartment line reliability is made lower. When the position of the parking-compartment-entrance facing end of the parked vehicle exceeds the position of the parking compartment-entrance-facing end of the target compartment line candidate toward a path in the parking lot, the first compartment line reliability is made particularly low.

Additionally, the first compartment line reliability is made lower as the parked vehicle is larger, namely, as the range of the parked vehicle is wider. Since the white line candidates positioned farther from the first vehicle C1 than from the parked vehicle are obstructed by the parked vehicle, the extraction accuracy of analysis of peripheral images may be decreased.

When the received parking-space related information from the outside includes the parking range information, and when a position of the white line candidate forming the parking compartment line candidate is similar to a side position of the parked vehicle indicated in the parking range information, the reliability of the parking compartment line candidate is decreases.

For example, it is supposed that the parking-space related information transmitted from the second vehicle C2 includes the parking range information indicating a range of a fifth vehicle C5. In this case, when a parking compartment line candidate including a parking compartment line L13 is extracted, the first compartment line reliability of the extracted parking compartment line candidate is made low.

The endpoint reliability is also corrected similarly. That is, the endpoint reliability is made lower as a position of the parking-compartment-entrance facing end of the parked vehicle is closer to the path to enter the parking compartment. In the direction of the parking compartment line having the endpoint candidate as an end, the endpoint reliability is made lower as the position of the parking-compartment-entrance facing end of the parked vehicle is closer to the path to enter the parking compartment.

The endpoint reliability is made lower as the parked vehicle is larger, namely, as the range of the parked vehicle is wider. When the parking-compartment-entrance facing end of the parked vehicle is placed at the parking-compartment-entrance facing end of the target compartment line candidate toward a rear side of the parking compartment, the extraction accuracy of the endpoints does not fall greatly. Therefore, when the parking-compartment-entrance facing end of the parked vehicle is placed at the parking-compartment-entrance facing end of the target compartment line candidate toward the rear side of the parking compartment, a degree of decrease of the endpoint reliability may be made small or the decrease amount may be made zero.

At S60, the parking compartment line candidates and the endpoint candidates are limited using the reliability after correction. Specifically, the parking compartment line candidates and the endpoint candidates are limited to parking compartment line candidates and endpoint candidates having equal to or more than a predetermined values that are set to the first compartment line reliability and the endpoint reliability after the corrections.

At S70, tracking is performed. The tracking continuously recognizes the parking compartment line candidates and the endpoint candidates, which are limited at S60 during travel of the first vehicle C1. When the first vehicle C1 travels, the relative positions of the parking compartment line candidates, the endpoint candidates limited at S60, and the first vehicle C1 change. According to the positions of the parking compartment line candidates and the endpoint candidates limited at S60 and a travel amount of the first vehicle C1, a analysis area in the peripheral image are determined. The analysis area is analyzed, and the parking compartment line candidates and the endpoint candidates limited at S60 is continuously recognized.

At S80, a second compartment line reliability is determined. The second compartment line reliability is determined from the direction of the parking compartment line candidates limited at S60 to a traveling direction of the first vehicle C1 (hereinafter, referred to as a travel route). The second compartment line reliability is made lower as the direction of the parking compartment line candidate to the travel route is further offset from a right angle. The parking compartment line candidate whose endpoint position overlaps with the travel route is excluded from the parking compartment line candidates.

At S90, the first compartment line reliability and the second compartment line reliability are integrated. Specifically, the first compartment line reliability and the second compartment line reliability are multiplies with respect to each parking compartment line candidate. The multiplication result is defined as an after-integration compartment line reliability.

At S100, the parking compartment line candidate having the after-integration compartment line reliability determined at S90 equal to or more than a predetermined value that is set to the after-integration compartment line reliability is determined as a parking compartment line.

Figure 10:
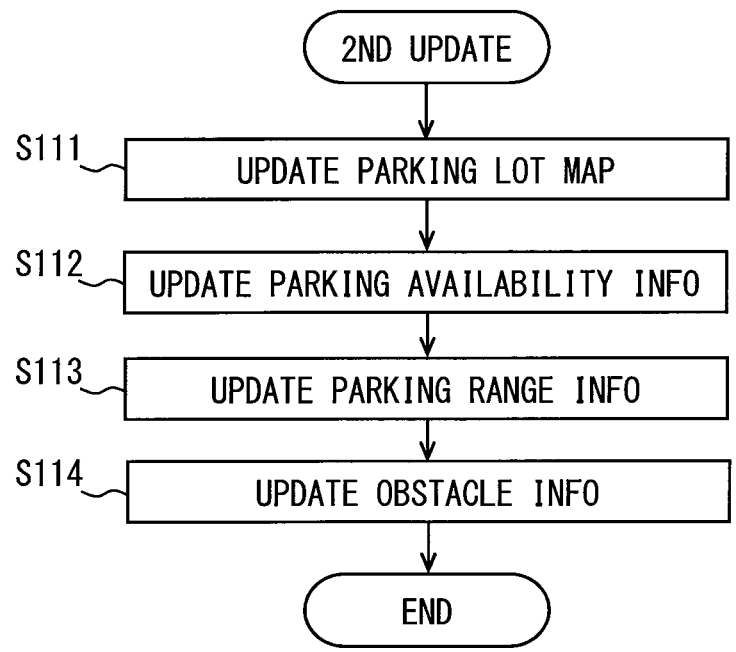
FIG. 10 is a flowchart illustrating processing of S110 of FIG. 3.

At S110, a second update process is performed to update the parking-space related information on the basis of the information other than the parking-space related information received from the outside. FIG. 10 illustrates the second update process.

In FIG. 10, the parking lot map is updated at S111 on the basis of the parking compartment lines determined at S100.

At S112, the parking availability information is updated based on a detection result of the vehicle-parked compartment detector 24. When the parking detector 22 of a different vehicle detects parking of the different vehicle and transmits in-parking information, and when the wireless receiver 12 of the first vehicle C1 receives the in-parking information, the parking availability information is updated. When the in-parking information is received from the different vehicle, the parking availability information about a parking compartment indicated in the in-parking information indicates that parking is unavailable. When the travel start detector 23 of a different vehicle detects a travel start of the different vehicle and transmits travel start information, and when the wireless receiver 12 of the first vehicle C1 receives the travel start information, the parking availability information is updated. When the travel start information is received, the parking availability information about a parking compartment indicated in the travel start information indicates that parking is available.

At S113, the parking range information is updated based on detection results of the parking range detector 25 from a time when a previous S113 is executed to a time when the current S113 is executed. At S114, the obstacle range information is updated based on detection results of the parking range detector 25 from a time when the previous S113 to the current S113.

At S120, the parking-space related information updated at S110 is transmitted to the outside of the first vehicle C1 from the wireless transmitter 11 of the wireless communicator 10.

According to the present embodiment, a parking compartment, which is a parking space, is determined using the parking-space related information received by the wireless receiver 12, in addition to the peripheral images captured by the front camera 7 and the rear camera 8. Therefore, it may be possible that the recognition accuracy of a parking compartment improves in comparison to when the parking compartment is determined only using the peripheral image captured by the front camera 7 and the rear camera 8.

The embodiment of the present disclosure has been described as an example. The present disclosure is not limited to the described embodiment. The following modifications, for example, are included in the technical range of the present disclosure. Various modifications are possible without departing from the scope of the present disclosure.

Modified Example 1

According to the above embodiment, the parking-space related information is updated during the travel of the first vehicle C1 on the parking lot. The present disclosure is not limited to this case. The parking detector 22 transmits the in-parking information regardless of whether the vehicle has been parked in a parking lot. That is, even when the vehicle is parked at a place other than a parking lot, the in-parking information is transmitted. Then, the receiver may receive the in-parking information at a place other than a parking lot. Then, when the in-parking information is received, the place where the in-parking information is received may be a parking space.

Modified Example 2

The travel start detector 23 transmits the travel start information regardless of whether the vehicle starts traveling in a parking lot. Then, when the in-parking information is received, when a position indicated in the in-parking information is on a road, and when the travel start information including the same position as the position indicated in the in-parking information is received, a parking time may be calculated. It may be determined whether a vehicle that has transmitted the in-parking information and the travel start information has been parked or stopped on the basis of the parking time. When the vehicle has been parked, a position where the vehicle has been parked may be determined as a parking space. When the vehicle has stopped, a position where the vehicle has stopped may not be determines as a parking space.

Modified Example 3

When it is unclear whether the first vehicle C1 is traveling in a parking lot, and when the parking-space related information including the parking range information is received, a parking space only around the parking range defined based on the parking range indicated in the parking range information may be searched for. The search for parking spaces is performed at S30 or later.

Modified Example 4

According to the above embodiment, the parking-space related information is transmitted from the vehicle. A road side unit may acquire the parking-space related information and transmit the parking-space related information. As a method of acquiring the parking-space related information by using the road side unit, the parking-space related information transmitted from a vehicle may be received. Additionally, the road side unit may include a camera, images captured by the camera may be analyzed, and various parking space informations may be determined. A parking lot map, which is static information, may be stored in advance.

It is noted that a flowchart or a processing of the flowchart in the present application includes steps (also referred to as sections), each of which is represented, for example, as S10. Further, each step may be divided into several sub-steps, and several steps may be combined into a single step.

While the parking space recognition apparatus and the parking space recognition system have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A parking space recognition apparatus comprising:
    an onboard camera mounted to a first vehicle and capturing a peripheral image around the first vehicle;
    a wireless receiver mounted to the first vehicle and receiving a parking-space related information that is transmitted from an outside of the first vehicle via wireless communication, the parking-space related information being used in determination of a parking space for the first vehicle; and
    a parking space determination portion mounted to the first vehicle and determining the parking space to park the first vehicle on a basis of the peripheral image captured by the onboard camera and the parking-space related information received by the wireless receiver,
    wherein the parking space determination portion determines the parking space for the first vehicle without referring to the parking-space related information, when a difference between a time when the wireless receiver has received the parking-space related information and a time when the parking space is determined is equal or greater than a predetermined time.

2. The parking space recognition apparatus according to claim 1, wherein:
    the wireless receiver receives, as the parking-space related information, an in-parking information that indicates a position of a vehicle-parked compartment, the vehicle-parked compartment being a parking compartment where a parked vehicle exists; and
    when the wireless receiver receives the in-parking information,
        the parking space determination portion limits a search area of the parking space to exclude the vehicle-parked compartment indicated in the in-parking information, and
        the parking space determination portion searches for a parking compartment line regarding the limited search area in the peripheral image.

3. The parking space recognition apparatus according to claim 1, wherein:
    the wireless receiver receives, as the parking-space related information, a parking range information that indicates a range where a parked vehicle is positioned; and
    the parking space determination portion
        analyzes the peripheral image to determine a pair of two white lines as a candidate of a parking compartment line,
        determines a compartment line reliability that is a reliability of the candidate of the parking compartment line on a basis of at least any of a width of the candidate of the parking compartment line, parallelism of the candidate of the parking compartment line, a degree of consistency of the two white lines, and a continuity to a different candidate of the parking compartment line, and
        when the wireless receiver receives the parking range information, corrects the compartment line reliability of a target candidate of the parking compartment line on a basis of a range of the parked vehicle indicated in the parking range information to a position of the target candidate of the parking compartment line, wherein the target candidate of the parking compartment line is the candidate of the parking compartment line including a white line positioned farther from the first vehicle than the range of the parked vehicle.

4. The parking space recognition apparatus according to claim 1, wherein:
    the wireless receiver receives, as the parking-space related information, a parking range information that indicates a range where a parked vehicle is positioned; and
    the parking space determination portion
        determines an endpoint candidate of a parking compartment line on a basis of an edge point of a brightness value in the peripheral image, determines an endpoint reliability that is a reliability of the endpoint candidate on a basis of a density of edge points in a local area where the endpoint candidate is included, and when the wireless receiver receives the parking range information, corrects the endpoint reliability on a basis of a position of the endpoint candidate in an extending direction of the parking compartment line including the endpoint candidate and of a range where the parked vehicle is positioned, the range being defined by the parking range information.

5. A parking space recognition system comprising:
the parking space recognition apparatus according to claim 2;
a parking detector detecting a parking of a second vehicle;
a position detector detecting a position of the second vehicle; and
a wireless transmitter transmitting, as the in-parking information, the position of the second vehicle detected by the position detector when the position detector detects the parking of the second vehicle.

6. The parking space recognition system according to claim 5, further comprising:
a travel start detector detecting that the second vehicle ends parking and starts traveling,
wherein:
when the travel start detector detects a start of travel of the second vehicle, the wireless transmitter transmits information that indicates a position where the second vehicle has been parked become an unoccupied state.

7. A parking space recognition system comprising:
the parking space recognition apparatus according to claim 2;
a vehicle-parked compartment detector mounted to a second vehicle and sequentially detecting the vehicle-parked compartment during a travel of the second vehicle in a parking lot; and
a wireless transmitter mounted to the second vehicle and transmitting a position of the vehicle-parked compartment detected by the vehicle-parked compartment detector as the in-parking information that indicates a position of a vehicle-parked compartment.

8. A parking space recognition system comprising:
the parking space recognition apparatus according to claim 3;
a parking range detector mounted to the second vehicle and sequentially detecting a range where the parked vehicle is positioned during a travel of the second vehicle in a parking lot; and
a wireless transmitter mounted to the second vehicle and transmitting a range where the parked vehicle is positioned, the range being detected by the parking range detector, as the parking range information.

9. The parking space recognition system according to claim 6, wherein: the parking detector, the position detector, the wireless transmitter, and the travel start detector are provided to the first vehicle.

10. The parking space recognition apparatus according to claim 1, wherein a case where the difference between the time when the wireless receiver has received the parking-space related information and the time when the parking space is determined is equal or greater than a predetermined time corresponds to a case where, at a time of the determination of the parking space for the first vehicle, the predetermined time has elapsed after the wireless receiver has received the parking-space related information.

* * * * *